United States Patent [19]

Tsuyoshi et al.

[11] Patent Number: 5,193,034
[45] Date of Patent: Mar. 9, 1993

[54] MAGNETIC DISK APPARATUS OF CONSTANT-DENSITY RECORDING TYPE, MAGNETIC DISK USED THEREFOR AND SERVO-WRITING DEVICE FOR PATTERNING ON THE MAGNETIC DISK

[75] Inventors: Toshiaki Tsuyoshi, Kawasaki; Yosuke Seo, Sagamihara; Hajime Aoi, Tachikawa; Makoto Saito, Hiratsuka, all of Japan

[73] Assignee: Hitachi, Ltd., Tokyo, Japan

[21] Appl. No.: 551,808

[22] Filed: Jul. 12, 1990

[30] Foreign Application Priority Data

Jul. 17, 1989 [JP] Japan .................................. 1-182575

[51] Int. Cl.$^5$ ............................................. G11B 27/30
[52] U.S. Cl. ..................................... 360/51; 360/77.08; 360/135
[58] Field of Search .............. 360/51, 75, 77.05, 77.08, 360/78.14, 135

[56]           References Cited
               U.S. PATENT DOCUMENTS

| | | | |
|---|---|---|---|
| 4,016,603 | 4/1977 | Ottesen | 360/72.2 |
| 4,714,967 | 12/1987 | Bizjak | 360/49 |
| 4,918,677 | 4/1990 | Ashinuma et al. | 360/51 |

FOREIGN PATENT DOCUMENTS 0366439  5/1990  European Pat. Off. ......... 360/78.11

OTHER PUBLICATIONS

Electronics Design, Nov. 13, 1986, pp. 141-144.

*Primary Examiner*—Joseph L. Dixon
*Assistant Examiner*—David L. Robertson
*Attorney, Agent, or Firm*—Fay, Sharpe, Beall, Fagan, Minnich & McKee

[57]           ABSTRACT

A constant-density type of magnetic disk apparatus is made up of a plurality of magnetic disks, wherein at least one of the surfaces of the magnetic disks is a servo face divided into a plurality of zones in the radial direction of the disks. A magnetic disk used in this apparatus and a servo-writing device for making this magnetic disk are also disclosed. In the magnetic disk apparatus and the magnetic disk, servo information regions and clock information regions are alternately provided on the servo face in the circumferential direction of the disks. The servo information regions are arranged radially with respect to the rotation center of the disks and each of the clock information regions includes a plurality of magnetic transitions representative of clocks, the number of which is different for each of the divided zones. A servo PLL circuit is provided to generate a servo clock signal on the basis of the signal reproduced from each of the servo information regions, and a write PLL is also provided to generate a write clock signal on the basis of the signal reproduced from each of the clock information regions. Also disclosed is a disk for use in a constant density-recording type magnetic disk apparatus, wherein a dummy track is provided along a zone boundary on the data face embedded with servo patterns of the disk.

20 Claims, 9 Drawing Sheets

MAGNETIC DISK APPARATUS OF CONSTANT-DENSITY RECORDING TYPE, MAGNETIC DISK USED THEREFOR AND SERVO-WRITING DEVICE FOR PATTERNING ON THE MAGNETIC DISK

BACKGROUND OF THE INVENTION

The present invention relates to magnetic disk equipment, and more particularly to a magnetic disk apparatus of a constant-density recording type, a magnetic disk used for the apparatus and a servo-writing device for patterning the magnetic disk.

The previously, most common type of recording type for magnetic disk apparatus is based on constant-track-capacity recording. In this type of recording, with the rotation speed of a magnetic disk being constant, the capacity of information per one round or revolution of the of track is the same in both the inner tracks and outer tracks of the disk. In this case, however, the recording density of information is lower with the outer tracks so that the recording efficiency of the magnetic disk is not sufficient.

Figure 1:
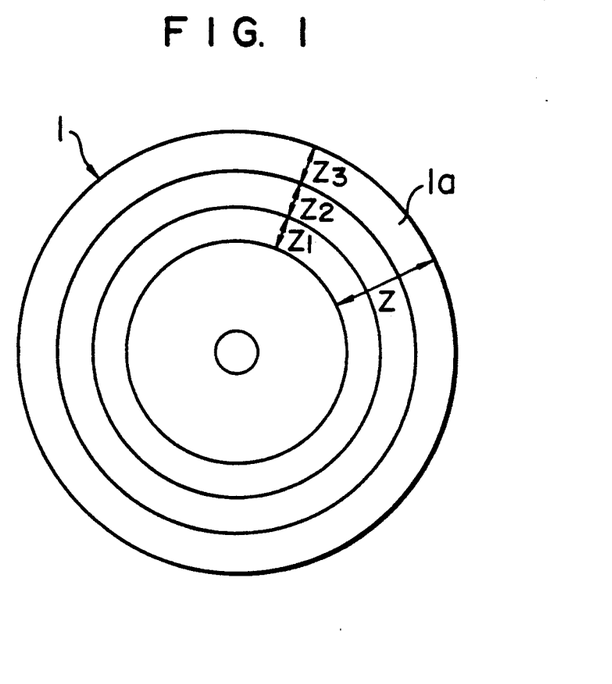
FIG. 1 is a plan view showing the data face of the magnetic disk used in a constant-density recording type magnetic disk apparatus.

To solve this problem, the 'constant-density' (or 'zone-bit') type of recording method has been proposed in e.g. an article by Mark S. Young entitled "Constant-density Recording Comes Alive With New Chips" in Electronic Design, Nov. 13, 1986, pages 141 to 144. In order to improve the capacity of information of the magnetic disk in particularly a small-sized magnetic disk apparatus, this constant-density recording makes all the tracks including inner tracks and outer tracks have substantially the same density of information. More specifically, in the constant-density recording method, as shown in FIG. 1, the data recording zone z of a data face 1a is divided into plural (e.g. three) zones, and information is recorded so that the recording density in each of the divided zones is substantially constant. The constant-density recording, therefore, provides a greater amount of information per one circle of track in the outer zones of the magnetic disk 1, and thus can increase the recording capacity up to about 1.5 times that of the prior art type of recording method.

Figure 2:
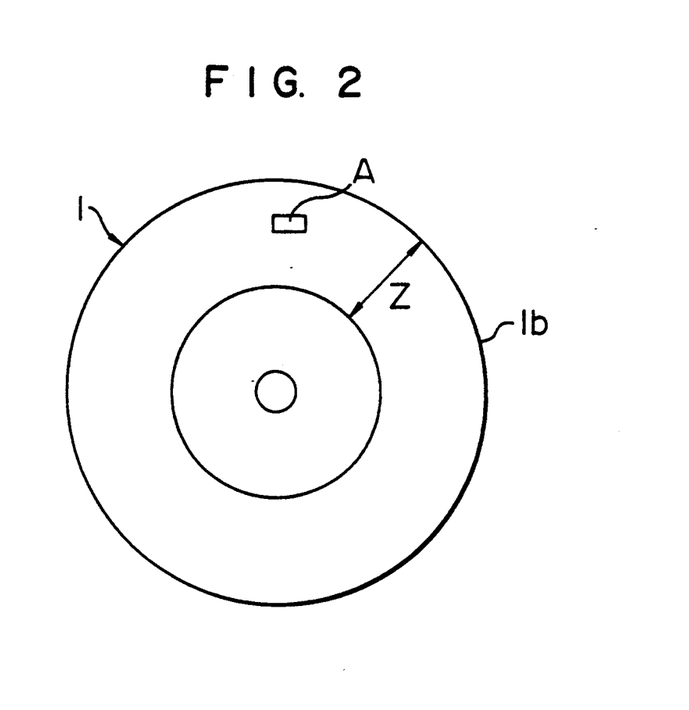
FIG. 2 is a plan view showing the data face of the magnetic disk used in the prior art magnetic disk apparatus.
Figure 3:
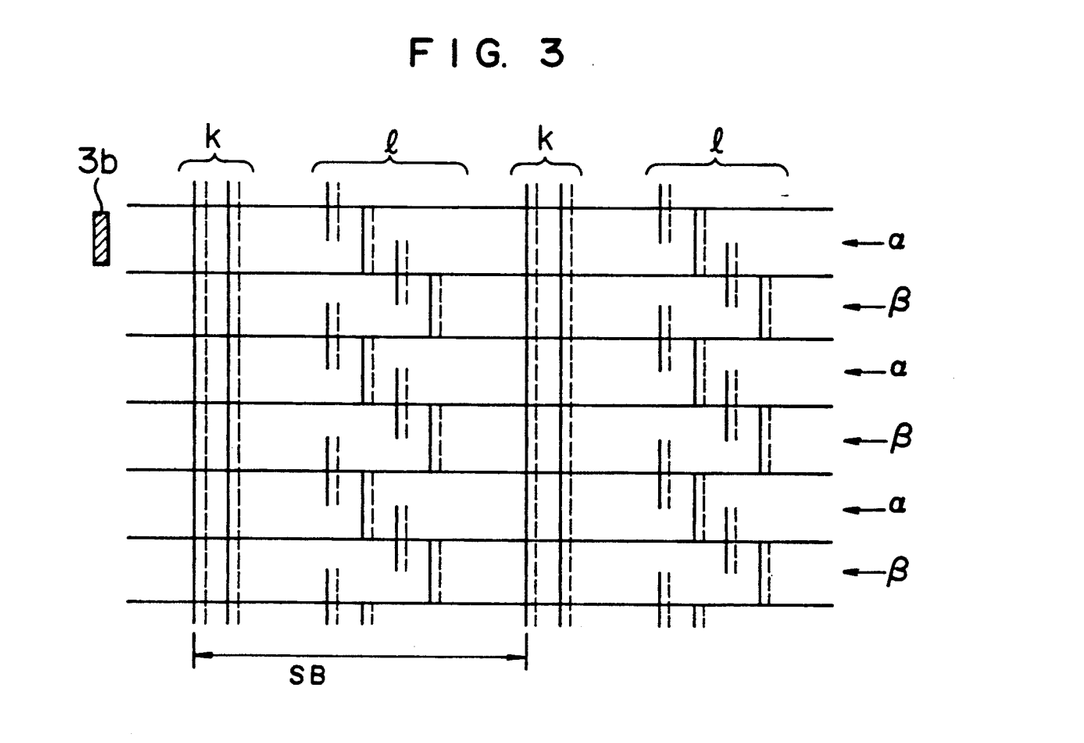
FIG. 3 is a view showing the magnetic recording state in an area A in FIG. 2.

FIG. 2 shows the servo face of the magnetic disk used in the prior art dedicated-servo, constant-track-capacity recording type of magnetic disk apparatus. FIG. 3 shows an example of the servo pattern magnetically recorded in an area A in FIG. 2. Additionally, in FIG. 3, the servo pattern is written in solid lines corresponding to a positive magnetic transition and in broken lines corresponding to negative magnetic transition.

In FIG. 3, $\alpha$ and $\beta$ are track centers; k's are synchronization information portions provided radially with respect to the center of the disk 1 with no space between the adjacent tracks; and l are servo information portions each of which consists of sets of four servo marks each displaced from the adjacent track by a half track in the radial direction. The synchronization information portions k and the servo information portions l are alternately arranged in the circumferential direction of the disk 1. Several thousands of 'servo bytes SB', each consisting of the adjacent synchronization information portion k and servo information portion l, are arranged on one circle of the servo face 1b.

In the magnetic disk apparatus in which the magnetic disk 1 having the servo face 1b as described above is used, a clock signal is generated by a PLL (Phase Locked Loop) circuit on the basis of the synchronization signal obtained from the synchronization information portion k; this clock signal is used as a reference clock signal or a write clock signal in recording information on the data face 1a and it is also used to generate a window signal (timing signal) for correctly detecting the servo information signal from the servo information portion l. Further, when a servo head 3b passes the servo information portion l, a servo signal is detected using the principle that the signal reproduced from the servo information pattern nearest to the servo head 3b among the four servo information marks has the largest amplitude. In this case, the above clock signal is used as a servo clock signal which is a reference signal for generating the servo signal. Incidentally, the synchronization information portion k being written with no space between the adjacent tracks permits the synchronization information portion to be detected even when the servo head 3b is not located at the track center (e.g. during seeking).

SUMMARY OF THE INVENTION

The constant-density recording provides a greater amount of information per one circle of track in the outer zones of the magnetic disk so that with the rotation speed of the magnetic disk being fixed, a higher information recording/reproducing frequency is provided for the outer zones. This requires changing the write clock signal for each of the divided three zones z1 to z3. However, in the servo face 1b as shown in FIGS. 2 and 3 the synchronization information portions (K's) and the servo information portions (l's) are arranged with completely the same phase from the inner zone to the outer zone in the radial direction of the magnetic disk 1. Therefore, if the signal from the synchronization information portion k is used as it is, it is difficult to generate the write clock signal at an optimum frequency different for each of the divided zones. To obviate this, the servo bytes could be formed so as to provide such different clock signals. In this case, however, the number of servo bytes corresponding to one track is different for each of the divided zones z1 to z3 so that the servo bytes are discontinuous at the boundaries of the zones z1 to z3. Thus, when the servo head 3a passes the boundaries of the divided zones during e.g. seeking, a cross track signal and a servo signal cannot be surely detected.

Further, also when an 'embedded servo', in which servo patterns are located on the data face unlike the dedicated servo, is used together with or independently of the dedicated servo, the servo patterns are discontinuous at the boundaries of the divided zones on the data face; the servo signal cannot be detected correctly, making the track following at the boundaries unstable.

The present invention has been accomplished in order to solve the above problems.

An object of the present invention is to provide a magnetic disk apparatus which can provide a write clock optimum for each of the divided zones and also provide a stabilized cross track signal and servo signal during seeking, a magnetic disk used for the apparatus and a servo write device which can form such a magnetic disk.

Another object of the present invention is to provide a magnetic disk apparatus which can surely control the track following at the boundaries of the divided zones in the constant-density recording in which servo patterns are located on a data face but not on a servo face.

In order to attain the above objects, in accordance with one aspect of the present invention, there is provided a constant-density recording type of magnetic disk apparatus made up of a plurality of magnetic disks attached to a spindle, magnetic heads for recording/reproducing information on faces of each of the disks, at least one of the faces being a servo face divided into plural zones in a radial direction, means for shifting the magnetic heads, servo information areas and clock information areas alternately arranged on the servo face in its circumferential direction, the servo information areas being disposed to form sectoral regions each starting from the rotating center of the magnetic disks and extending through all the divided zones, and the number of magnetic transitions representative of clocks in the clock information areas being different for each of the divided zones, a servo PLL circuit for generating a servo clock signal on the basis of the signal reproduced from the servo information areas, and a write PLL circuit for generating a write clock signal on the basis of the signal reproduced from the clock information area. In this case, preferably the clock information is not written on the clock information areas at the boundaries of the divided zones.

In accordance with another aspect of the present invention, there is provided a magnetic disk used in a constant-density recording type of magnetic disk apparatus made up of a plurality of magnetic disks attached to a spindle, magnetic heads for recording/reproducing information on surfaces of each of the disks, at least one of the surfaces being a servo face divided into plural zones in a radial direction, means for shifting the magnetic heads, wherein servo information areas and clock information areas are alternately arranged on the servo face in its circumferential direction, the servo information areas are disposed to form sectoral regions each starting from the rotating center of the magnetic disks and extending through all the divided zones and the number of magnetic transitions representative of clocks in the clock information areas are different for each of the divided zones. In this case, preferably, the clock information is not written to the clock information areas at the boundaries of the divided zones.

In accordance with a further aspect of the present invention, there is provided a servo-writing device made up of a recording head, means for designating the divided zone on which the recording head is to be located, a data face with the first clock pattern recorded thereon, means for reproducing the first clock pattern, oscillating means for generating a clock signal corresponding to the magnetic transitions in the designated divided zone in response to the designating means, means for forming a pulse train corresponding to the first clock pattern from the signal output from the clock pattern reproducing means, means for generating a window signal alternately designating the servo information area and the clock information area on the basis of the pulse train output from the pulse train forming means, switching means for selectively producing, in response to the window signal, the clock signal from the oscillating means or the pulse train from the pulse train forming means, and means, connected with the recording head, for generating, on the basis of the output from the switching means and window signal, a servo pattern to be written on the servo information area and the second clock pattern to be written on the clock information area, the second clock pattern being different for each of the divided zones.

In accordance with a further aspect of the present invention, the embedded-servo constant-density recording type magnetic disk is provided with dummy tracks at zone boundaries which do not contribute to recording/reproduction of data.

In the magnetic disk apparatus and magnetic disk mentioned above, the number of magnetic transitions representative of clocks in the clock information areas of the servo disk surface is set to be different for each of the divided zones so that the frequency of the write clock signal can be optionally set for each of the divided zones. Also, the servo information areas are provided so as to extend radially from the center of the magnetic disk so that they are not discontinuous at the zone boundaries; in this case, if clock information is not written at the zone boundaries, no unsuitable write clock signal is generated there.

The servo-writing format in accordance with the present invention is suitable for magnetic disks and is simple in construction.

In the case of the above embedded-servo constant-density recording type magnetic disk including dummy tracks and in the case of the magnetic disk apparatus as well, only the servo patterns on the adjacent two zones may be written on the dummy track by a half track for each zone. By doing so, a correct servo signal can be provided in the endmost track at the zone boundary. Thus, reliability of servo positioning at the zone boundaries can be enhanced and also the servo write of the servo patterns on the data face can be easily executed.

DESCRIPTION OF THE PREFERRED EMBODIMENTS

Figure 4:
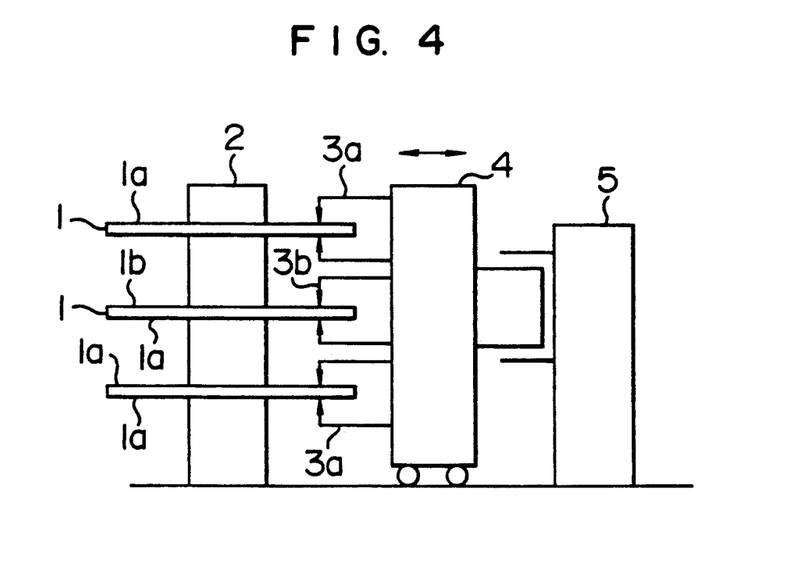
FIG. 4 is a schematic sectional view of a magnetic disk apparatus.

FIG. 4 is schematic sectional view of an example of the magnetic disk apparatus to which the present invention can be applied. In FIG. 4, 2 denotes a spindle; 1 magnetic disks attached to the spindle 2; 1a a disk face of each of the magnetic disks 1; 1b a servo face of the magnetic disks 1; 4 a shifting device (carriage); and 5 a driving device for driving the carriage. The carriage 4 and the driving device 5 constitute a shifting means. 3a denote data heads attached to the carriage 4; and 3b servo heads attached to the carriage 4.

The information recording/reproducing in this magnetic disk apparatus is executed as follows. A cross track signal and a servo signal indicative of the relative distance between the servo head 3b and individual tracks are provided on the basis of the signal reproduced from the servo face 1b; the cross track signal and servo signal are used to control the driving device 5. The driving device 5 drives the carriage 4 to position the data head 3a on a predetermined track. The data head 3a is used to execute recording/reproduction of information on the data face 1a.

Figure 5:
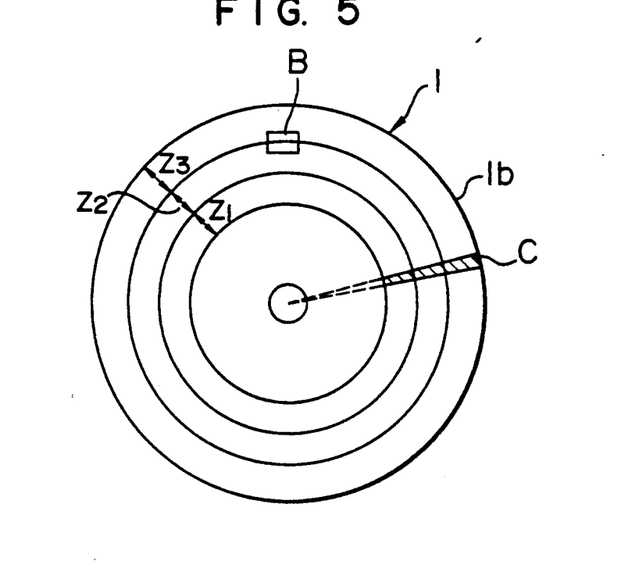
FIG. 5 is a plan view showing the servo face of the magnetic disk according to one embodiment of the present invention.
Figure 6:
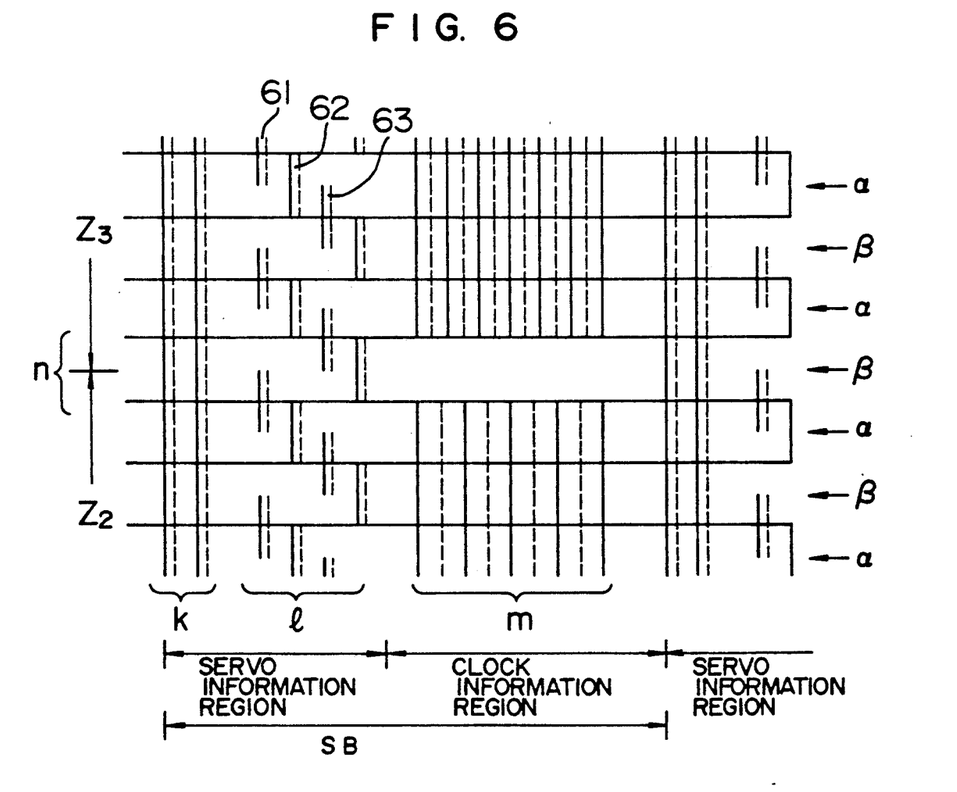
FIG. 6 is a view showing the magnetic recording state of an area B in FIG. 5.

FIG. 5 shows the servo face of the magnetic disk according to one embodiment of the present invention, which is used in the magnetic disk apparatus as shown in FIG. 1. FIG. 6 shows the magnetic pattern in an area B in FIG. 5. As seen from FIG. 5, each of the servo bytes on the servo face consists of a servo information region and a clock information region; the servo information region consists of a synchronization information area k and a servo information area l. Each of the servo information regions is provided radially with respect to the rotating center of the magnetic disk 1. More specifically, the servo information region, as shown in FIG. 5, is a sectoral area starting from the rotating center of the disk 1 and extending through divided zones z1 to z3. On the other hand, the clock information region consists of a clock information area m. The time pitch (i.e. time distance between adjacent magnetic transitions) of the clock information patterns in the clock information area m is different for each of the divided zones z1 to z3. Specifically, the time pitch of the clock information pattern in the clock information area in the divided zone z3 is shorter than that in the divided zone z2 inner of the zone z3, which is in turn shorter than that in the divided zone z1 inner of the zone z2. Also the clock information region has no clock information pattern at the boundaries between the zones z1 and z2 and between z2 and z3.

Figure 7:
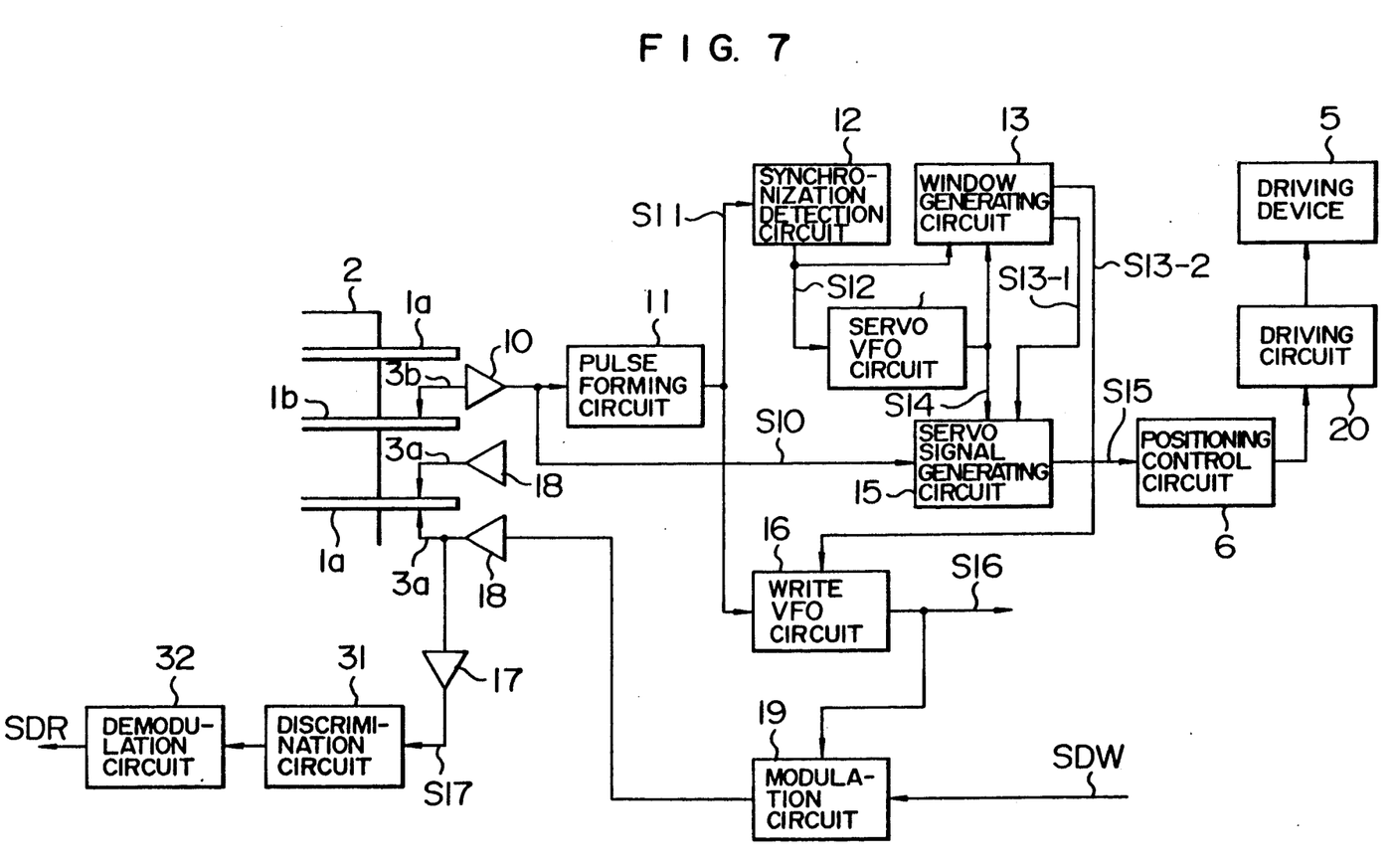
FIG. 7 is a block diagram of a circuit system in the magnetic disk apparatus according to another embodiment of the present invention.
Figure 8:
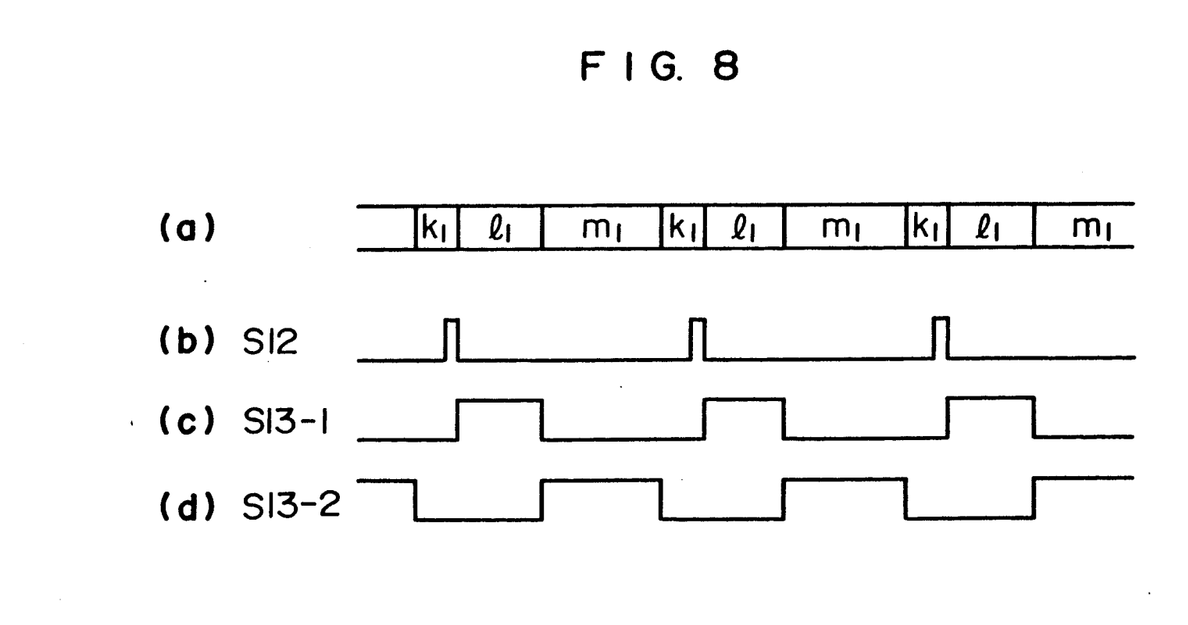
FIG. 8 is a timing chart for explaining the operation of the circuit system of the magnetic disk apparatus shown in FIG. 7.

FIG. 7 shows the circuit block diagram of the magnetic disk device according to another embodiment of the present invention. FIG. 8 shows signal waveforms at several points in the circuit system shown in FIG. 7.

In FIG. 7, 10 denotes a preamplifier, connected with the servo head 3b, for amplifying the signal read using the servo head 3b. The signal S10 amplified by the preamplifier 10 is an analog signal having a positive peak on solid lines and a negative peak on broken lines in FIG. 6. Now if the servo head 3b is just following e.g. the center a of a certain track in the zone z3, the amplitude of the signal S10 is equal at the positions of magnetic transitions 61 and 63; the maximum amplitude thereof is provided at the position of magnetic transitions 62. On the other hand, if the servo head 3b is following the position displaced slightly outside from the center a in the same track, the width of the portion of the servo head 3b overlapping the magnetic transitions 61 is increased while that overlapping the magnetic transitions 63 is decreased. Thus, the amplitude of the signal S10 when passing the magnetic transitions 61 is larger than that when passing the magnetic transitions 63.

Again in FIG. 7, 11 denotes a pulse forming circuit which serves to generate a pulse train signal S11 consisting of pulses corresponding to the peaks of the signal S10. As seen from FIG. 8, the pulse train signal S11 consists of a synchronization information signal k1, a servo information signal l1, and a clock information signal m1, which are repeated in that order. Thus, the pulse train signal corresponding to the magnetic transitions in the synchronization information areas k, the servo information areas l and the clock information areas m can be provided. 12 denotes a synchronization detecting circuit which serves to detect the synchronization information signal k1's, i.e. the signal S12, as shown in FIG. 8(b), from the pulse train signal S11 through pattern recognition. 14 is a servo VFO (Variable Frequency Oscillator) circuit, a kind of PLL, which serves to produce a servo clock signal S14, a reference for generation of a servo signal, in response to the signal S12. The servo clock signal S14 is a signal which is in phase with the signal resulting from the magnetic transitions in the synchronization information area k and has a frequency ten times or more as large as that of this signal. 13 is a window generating circuit which, in response to the servo clock signal S14, serves to extract a window signal S13-1, as shown in FIG. 8(c), corresponding to the servo information area l from the read signal S10, and extract a window signal S13-2, as shown in FIG. 8(d), corresponding to the clock information signal m1 from the pulse train signal S11. 15 is a servo signal generating circuit which serves to generate a signal S15 in response to the read signal S10, the window signal S13-1 and the servo clock signal S14. The signal S15 is used as a servo signal. Specifically, the signal S15 serves as the servo signal indicative of displacement of the servo head 3b from a track center during reading and writing, and as the cross track signal having a repetitive waveform the amplitude of which becomes zero whenever the servo head 3b crosses the track center during seek. 16 is a write VFO circuit, a kind of PLL, which serves to produce a write clock signal in response to the pulse train signal S11 and the window signal S13-2. This write clock signal is synchronizing with the pulse train signal read from the clock information region shown in FIG. 6. The write clock signal is different in frequency from one zone to another. 19 denotes a modulation circuit for modulating an SDW signal during information recording using the write clock signal S16. 18 denotes a write driver for driving the modulated information signal. 6 denotes a positioning control circuit for producing a head positioning signal in response to the signal S15. 20 denotes a driving circuit for driving the driving device in response to the positioning signal from the positioning control circuit 6. 17 denotes a read amplifier for amplifying the signal reproduced from the data head 3a to provide a signal S17. 31 denotes a discrimination circuit for discriminating which of '0' and '1' the logic level of the reproduced signal takes. 32 denotes a demodulation circuit for demodulating the output from the discrimination circuit into an information signal SDR.

In the magnetic disk apparatus, and the disk used in the apparatus, the time pitch of the clock information patterns of the clock information area m can be arbitrarily made different for each of the divided zones z1 to z3 so that the frequency of the write clock signal S16 can also be arbitrarily set for each of the divided zones; thus, the write clock signal S16 optimum for each zone can be obtained. Further, the servo information regions are provided radially with respect to the rotation center of the magnetic disk 1 so that the servo information regions are not discontinuous at the boundaries n in the divided zones z1 to z3; thus, the servo signal and cross track signal which are stabilized also during seek. It should be noted that the frequency of the servo clock signal S14 is fixed through the divided zones z1 to z3.

Furthermore, no clock information pattern is provided in the clock information regions at the boundaries n in the divided zones z1 to z3, i.e. no information is provided there so that no unsuitable write clock signal is generated there; thus, recording/reproducing of information can be surely executed. Additionally, recording/reproducing of information is not made at the boundaries n in the divided zones z1 to z3 on the data face 1a.

Figures 9A, 9B:
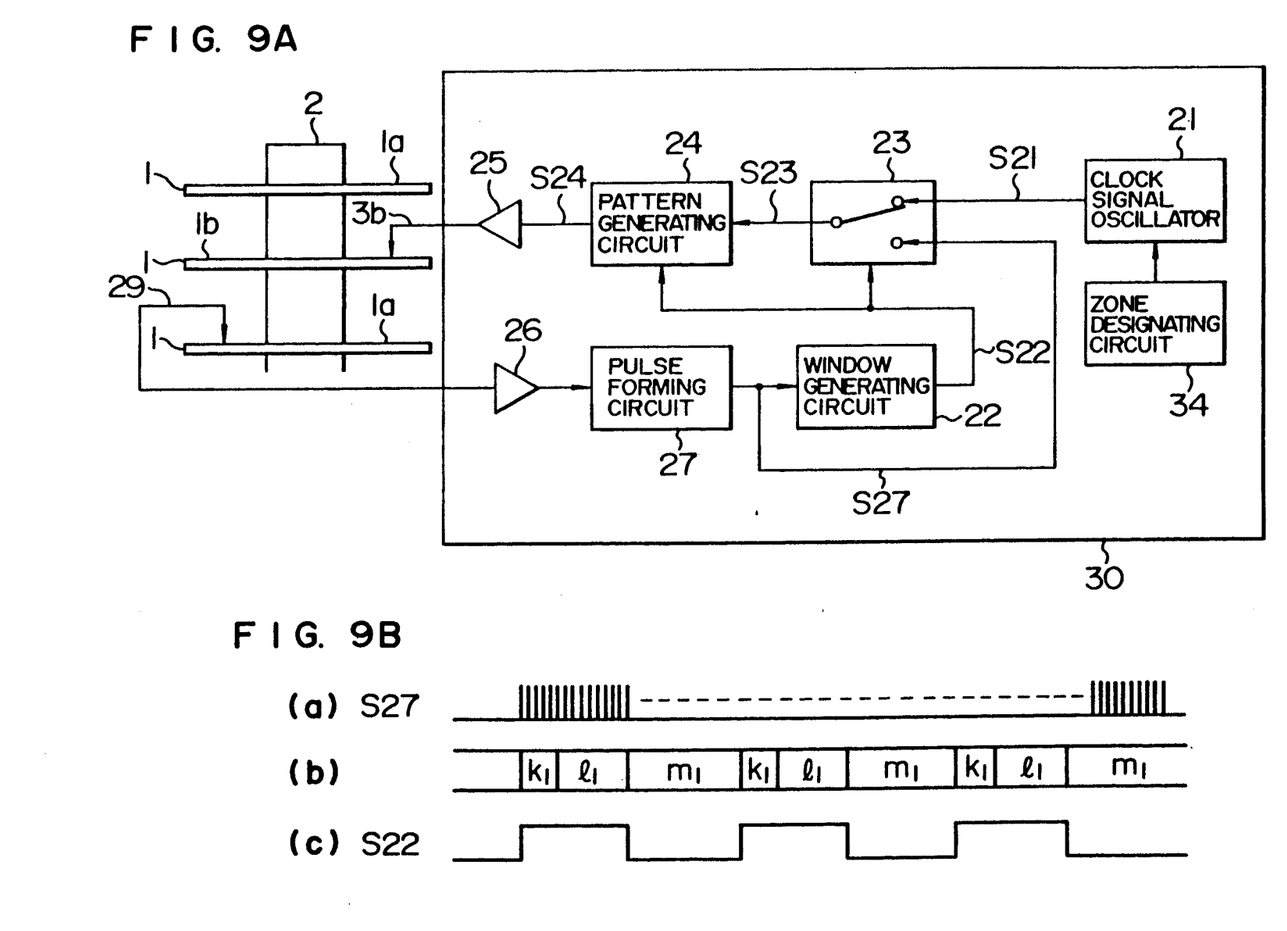
FIG. 9A is a block diagram of the main part of the servo-writing device according to a further embodiment of the present invention.
FIG. 9B is a timing chart for explaining the operation of the servo-writing device shown in FIG. 9A.

Now referring to FIGS. 9A and 9B, explanation will be given for a servo-writing device according to a further embodiment of the present invention. FIG. 9 is a block diagram of the servo-writing device 30. In FIG. 9, 21 denotes a clock signal oscillator; 22 a window generating circuit which is constituted by e.g. a counter; 23 a switching circuit; 24 a pattern generating circuit which is constituted by a kind of ROM; 25 a write driver; 26 a preamplifier; 27 a pulse forming circuit; and 34 is a zone designating circuit. Additionally, the clock signal oscillator 21 is adapted so as to vary the oscillation frequency in accordance with each of divided zones.

Generally, for servo writing for the magnetic disks 1, prior to writing servo patterns on the servo face 1b, clock patterns are previously written on either one of the data faces 1a using a separate fixed reference head 29 which is not engagement with the data head 3a and the servo head 3b; the clock patterns are written to equally divide one circle of track by a predetermined integer. Thereafter, the servo patterns will be written on the servo face 1b by reproducing the clock patterns using the fixed reference head 29 to provide a clock signal, and shifting the servo head 3b in the radial direction by half track using the clock signal as a reference signal. For example, the servo patterns one cycle of which consists of two kinds of patterns $\alpha$ and $\beta$ as shown in FIG. 3 can be formed by successively changing them for the respective tracks using the clock signal as a reference so as to execute the servo writing.

Also in the servo-writing device according to the present invention, clock patterns are previously written on either one of the data faces 1a. FIG. 9A relates to the subsequent operation. This operation will be explained below also using the timing chart of FIG. 9B.

In operation, the clock patterns written on the data face 1a reproduced using the fixed reference head 29 are amplified by the preamplifier 26. The signal from the preamplifier 26 is subjected to differentiation processing by the pulse forming circuit 27 to provide a pulse train signal S27 which is correctly in phase with the rotation of the magnetic disk 1. The pulse train signal S27 is sent to the window generating circuit 22 to produce a window signal indicative of changes between the servo information region consisting of a synchronization information area k1 and a servo information area 11, and the clock information region m1 as shown in FIG. 9B(c). The window signal S22 is supplied to the switching circuit 23 and the pattern generating circuit 24. The switching circuit 23 is supplied with two kinds of signals, i.e. an output signal S21 from the clock signal oscillator 21 which can vary the oscillation frequency for each zone and the pulse train signal S27 output from the pulse creating circuit 27. The switching circuit 23 switches these two kinds of clock signals S21 and S27 using the signal S22 as a control signal. The signal S23 generated from the switching circuit 23 when the two kinds of clock signals are alternately switched by the switching circuit 23 is supplied to the pattern generating circuit 24 as a clock signal. Thus, the output signal S24 from the pattern generating circuit 24 is generated as follows. A synchronization information pattern and a servo information pattern are generated in accordance with the clock signal S27 from the pulse forming circuit 27 while a clock information pattern is generated in accordance with the clock signal S21 from the clock signal oscillator 21. The signal S24 is written on the servo face 3b through the write driver 25 and the servo head 3b to execute the servo write. Additionally it should be noted that the pattern generating circuit 24 previously stores the synchronization and servo patterns such as $\alpha$, $\beta$, . . . . . . to be written in the servo information region and the clock information pattern to be written in the clock information region. The zone designating circuit 34, when having counted a predetermined number of tracks in each zone by e.g. monitoring the rotation of the spindle, designates the zone where the servo patterns are to be written for the clock signal oscillator 21. The clock signal oscillator 21, in response to this designation, generates the clock signal having the frequency corresponding to the next zone.

By setting the oscillation frequency of the clock signal oscillator 21 for a higher frequency for a more outer zone of the magnetic disk 1, the servo writing can be realized for the disk. Such a servo-writing device is low in the production cost because of its simple construction.

Now referring to FIGS. 10 and 11, explanation will be given for embodiments according to another aspect of the present invention.

Generally, the servo system in a magnetic disk apparatus includes the dedicated servo type described above and an embedded servo type in which with servo patterns intermittently provided on the data face, a servo signal is generated from the track itself where data are recorded or reproduced to control positioning of a data head. Generally, the dedicated servo scheme is suitable to high speed track seek whereas the embedded servo scheme is suitable to high precision track following. In order to realize both high speed track seek (access) and high precision track following (positioning), a composite system in which both types of servo can be combined is proposed. In the composite servo system, the servo disk is mainly used for control of the track seek and the embedded servo is mainly used for control of the track following.

Figure 10:
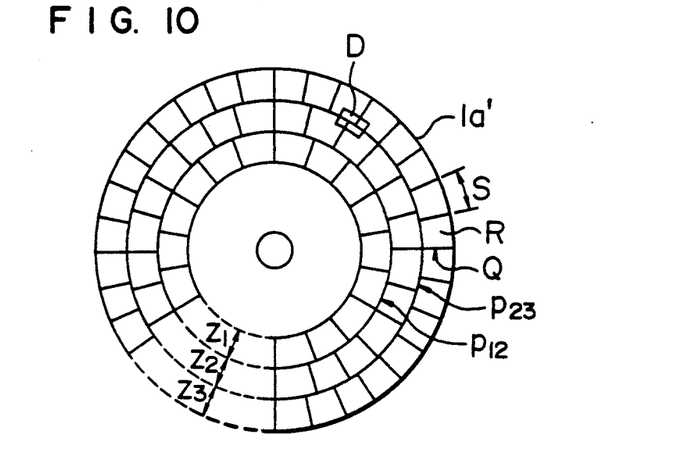
FIG. 10 is a plan view showing the servo face of a constant-density recording type magnetic disk in which servo patterns are recorded on the data face according to a still further embodiment of the present invention.

FIG. 10 shows the data face of the magnetic disk 1a for the composite servo system in the constant-density recording, in which servo patterns and also dummy tracks are provided. The data face of the disk 1a' includes three zones z1 to z3; the more outer zone has a larger number of sectors S which are units of data recording. Each of the sectors consists of servo information regions Q and data recording regions R. Although the servo regions (Q's) are arranged in the radial direction of the data disk 1a' in the same zone, the radial lines are discontinuous at the boundaries between the zones z1 and z2 and between the zones z2 and z3. One circle of track includes several tens to several hundreds of sectors, and the length of each sector is several tens to one hundred times that of the servo byte SB shown in FIGS. 3 and 6. The dummy tracks P12 and P23 are arranged at the boundaries between z1 and z2 and between z2 and z3, respectively.

Figure 11:
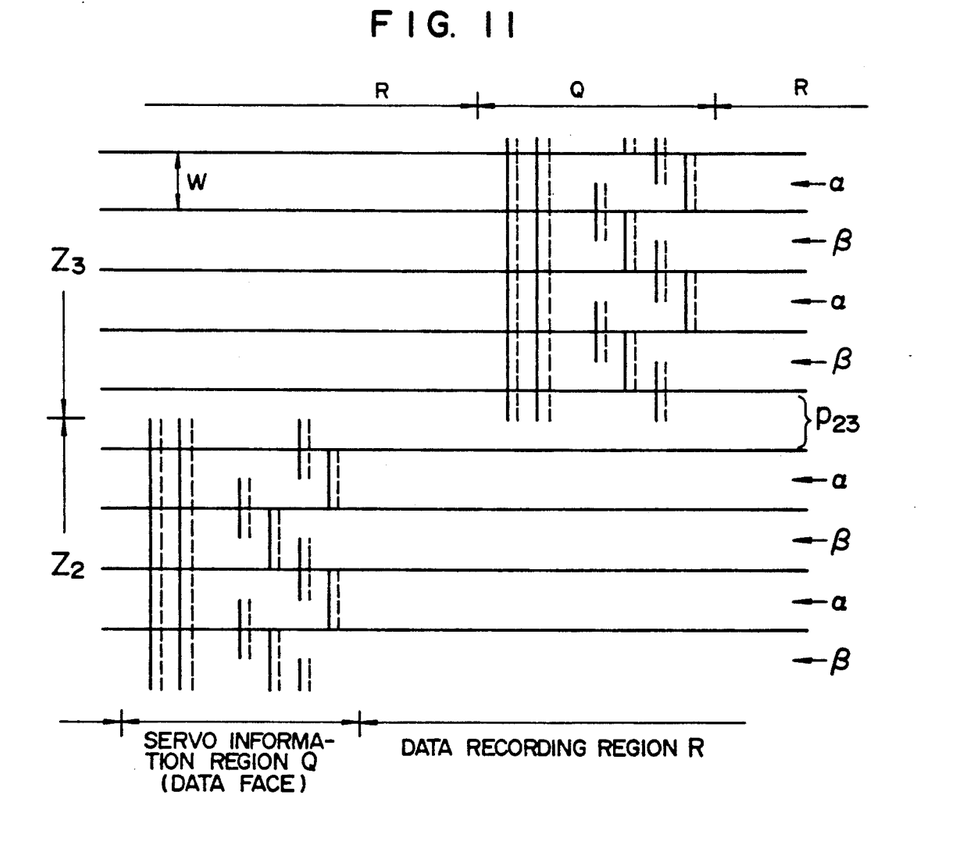
FIG. 11 is a view for explaining the dummy tracks at zone boundaries on the servo face in FIG. 10.

FIG. 11 is an enlarged view of a zone boundary region D between the zones z2 and z3 in FIG. 10. The servo pattern region Q is a region where servo patterns are written during servo writing whereas the data recording region R is a region where data are written by a user. Generally, the servo patterns are written during the servo write by shifting a magnetic disk having a width substantially equal to a track width w by half track (w/2) for each rotation of the disk in the radial direction of the disk. Therefore, with the track centers of $\alpha$ and $\beta$, the servo pattern protrudes from the servo information region by half track width at the zone boundary; this portion corresponding to the half track is written in the dummy track P23. The provision of such a dummy track at the zone boundary, for example when the data head slightly deviates toward the dummy track during its following the endmost track center $\beta$ in the zone z3, permits a correct servo signal corresponding to the deviation to be provided from the servo information region Q.

Figure 12:
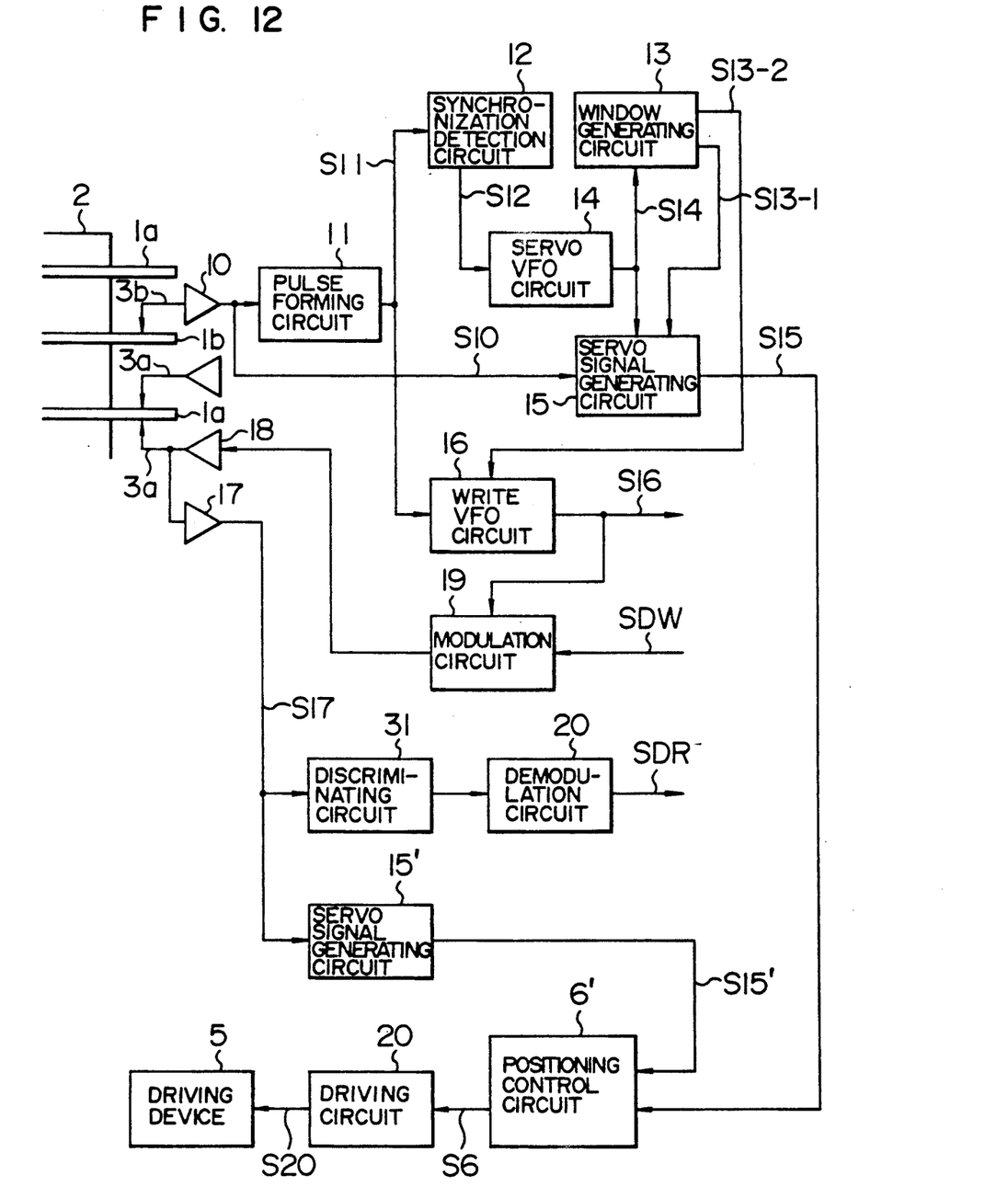
FIG. 12 is a block diagram of the magnetic disk apparatus according to a further embodiment of the present invention in which the disk with dummy tracks on its data face is used.

FIG. 12 is a block diagram of the magnetic disk apparatus in the composite servo system using the data disk with the dummy tracks as shown in FIGS. 10 and 11 according to a further embodiment of the present invention. The basic construction of this embodiment is substantially the same as that of FIG. 7 but is mainly different in the provision of a servo signal generating circuit 15' therefrom; the servo face 1b is the same as that shown in FIGS. 5 and 6. Like reference numerals in FIG. 12 denote like parts in FIG. 7.

In operation, the signal S17 reproduced from the data head 3a and amplified by the read amplifier 17 is supplied to the discrimination circuit 31 for discriminating in which state of '1' and '0' the data is, and the servo signal generating circuit 15'. The servo signal generating circuit 15' generates the servo signal corresponding to the servo information region Q on the data face. A positioning control circuit 6', in response to the servo signal S15 resulting from the servo face and the servo signal S15' resulting from the data face, executes the processings of switching therebetween and composition thereof. The signal S6 output from the positioning control circuit 6' is supplied to the driving circuit 20, and the signal S20 output from the driving circuit 20 is used to drive the driving device 5. Thus, by shifting the data head 3a and the servo head 3b in the radial direction of the disk, positioning control for these heads can be carried out. The servo signal S15' from the data face is mainly used during track following servo whereas the servo signal S15 from the servo face is mainly used during track seek. By using the constant-density recording type disk with dummy tracks on the data face according to the present invention, the magnetic disk apparatus in the composite servo system having the construction described above can realize good track following characteristic at the zone boundaries.

Further, although the composite servo system according to this embodiment is desired to take the servo face as shown in FIG. 5, it may adopt any other pattern as long as a correct cross track signal can be obtained during track seek and also a desired write clock signal is obtained for each zone. For example, in the case where the synchronization information area k and the servo information areas l are arranged in phase with each other in the radial direction from the inner zone to the outer zone of the disk 1, a desired write clock can be obtained by supplying the reference clock ($f_1$) from the synchronization information areas to the PLL having a 1/N frequency divider through a 1/M frequency divider.

Figure 13:
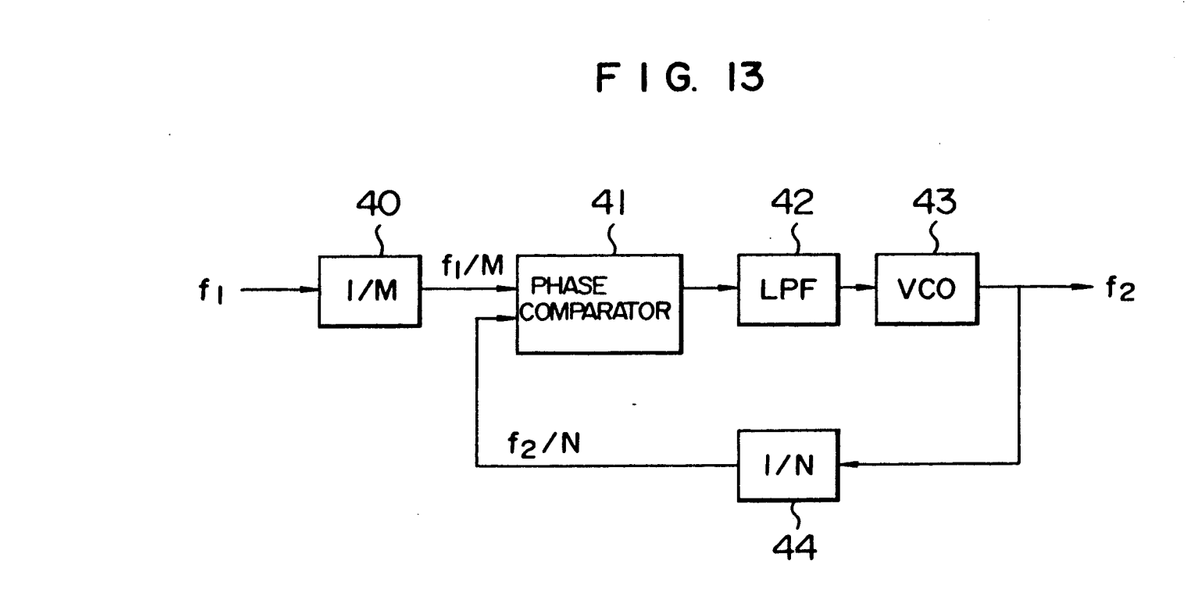
FIG. 13 is a block diagram of a circuit capable of generating a write clock pulse of a desired frequency.

FIG. 13 is a block diagram showing an example of such a circuit.

In the figure, the reference clock having a frequency f1 is supplied either from the synchronization information areas or from a reference oscillator. Having received the reference clock ($f_1$), a frequency divider 40 divides the frequency $f_1$ to produce a signal having a frequency of $f_1/M$. A phase comparator 41, a low-pass filter (LPF) 42, a voltage controlled oscillator (VCO) 43 and a 1/N frequency divider 44 constitute a PLL. The overall circuit operates to satisfy a relation $f_1/M = f_2/N$, so that a pulse signal having a frequency of $f_2 = f_1 \cdot (N/M)$ is obtained as an output signal $f_2$ of the PLL. Thus, various oscillation frequencies can be obtained by changing the frequency division ratios M and N.

Further, in the constant-density recording, the provision of the dummy tracks at the zone boundaries is efficient for the data face in the embedded servo system having no servo disk, as well as for the composite servo system as shown in FIGS. 10 to 12. In this case, the magnetic disk 1a' as shown in FIG. 10 is used in the magnetic disk apparatus of FIG. 4 in place of the disk 1. The magnetic disk apparatus comprises a circuit for detecting, in the radial direction of the disk, deviation of the data head 3a from the track being followed on the basis of the signal reproduced from the servo information area of each divided zone, and a circuit, connected with the shifting device 4, for controlling the shifting device 4 in response to the detected signal from the detecting circuit so that the data head 3a follows the center of the pertinent track; recording/reproduction of data can be made on the data recording region of the magnetic disk while controlling the following of the data head 3a.

As understood from the explanation hitherto made, with the magnetic disk apparatus according to the present invention and the disk used in the apparatus, any frequency of the write clock signal can be set for each of the divided zones so that the write clock signal optimum for each zone can be provided; the servo information regions are continuous at the zone boundaries so that a stabilized servo signal and a stabilized cross track signal can be provided during track seek.

Further, if no clock information is written in the clock information regions at the zone boundaries, no unsuitable clock signal is produced there; this assures recording/reproducing of information.

Further, the servo-writing device according to the present invention is low in production cost because of its simple construction.

Further, the magnetic track with dummy tracks on its data face permits a correct servo signal to be produced for the track at the zone boundary. The constant-density recording type of magnetic disk apparatus using such a magnetic disk, therefore, can realize stabilized track following at the zone boundaries.

The present invention can provide remarkable meritorious effects as mentioned above.

We claim:

1. A magnetic disk apparatus of constant-density recording type comprising:
   a plurality of disks attached around a spindle;
   a plurality of magnetic heads for executing recording-/reproducing of information for each of said magnetic disks;
   at least one of the surfaces of said magnetic disks being a servo face divided into a plurality of zones in the radial direction of the disks, servo information regions and clock information regions being alternately provided on the servo face in the circumferential direction of the disks, each of said servo information regions being disposed to form a sectoral region substantially starting from the center of the disk and extending through the divided zones, each of said clock information regions including a plurality of magnetic transitions representative of clocks, the number of which is different for each of said divided zones;
   means for generating a servo control signal on the basis of the signal reproduced from each of said servo information regions;
   means for shifting said magnetic heads in response to said servo control signal;
   means for generating a write clock signal on the basis of the signal reproduced from each of said clock information regions;
   means for writing information in said magnetic disks on the basis of said write clock; and
   means for reading the information from said magnetic disks.

2. A magnetic disk apparatus according to claim 1, wherein said servo face includes, along each of boundaries between the adjacent divided zones in each of said clock information regions, a blank area where no magnetic transition is provided.

3. A magnetic disk apparatus according to claim 1, wherein a more outer divided zone of said servo face includes a larger number of magnetic transitions.

4. A magnetic disk apparatus according to claim 1, wherein said servo control signal generating means includes a servo PLL for generating a servo clock signal on the basis of said reproduced signal from each of said servo information regions.

5. A magnetic disk apparatus according to claim 1, wherein said write clock signal generating means includes a write PLL for generating a write clock signal on the basis of said reproduced signal from each of said clock information regions.

6. A magnetid disk apparatus according to claim 1, wherein at least one said plurality of the magnetic disks is a constant density recording type magnetic disk having a plurality of tracks provided in each of said divided zones and extending in the circumferential direction, the number of said tracks being arbitrary in each of said divided zones;
   the physical length of one sector in the inner most track in each said divided zone being substantially the same for each said divided zone;
   said divided zones having boundaries in the radial direction thereof; and
   a generally concentric annular region provided at each of the boundaries between adjacent ones of said divided zones where no data is recorded by a user, but wherein servo information that is written in each one of the adjacent divided zones is further written in said annular region from respective side edges of said annular region by at least a half track width.

7. A magnetic disk apparatus according to claim 6, wherein no magnetic transition is provided in said annular region.

8. A magnetic disk for use in a constant-density recording type magnetic disk apparatus, one surface of which is a servo face divided into a plurality of zones in the radial direction of said disk, comprising:
   servo information regions and clock information regions alternately provided on the servo face in the circumferential direction of the disk;
   each of said servo information regions being disposed so as to form a sectoral region substantially starting from the center of the disk and extending through the divided zones; and
   each of said clock information regions including a plurality of magnetic transitions representative of clocks, the number of which is different for each of said divided zones.

9. A magnetic disk according to claim 8, wherein said servo face includes, along each of boundaries between the adjacent divided zones in each of said clock information regions, a blank area where no magnetic transition is provided.

10. A magnetic disk according to claim 8, wherein a more outer divided zone of said servo face includes a larger number of magnetic transitions.

11. A servo write device for making the servo face according to claim 8, comprising:
    a recording head;
    means for designating a divided zone where a predetermined servo pattern is to be recorded using said recording head;
    a data face with a first predetermined clock pattern recorded thereon;
    means for reproducing said first predetermined pattern;
    oscillation means for generating a clock signal corresponding to said magnetic transitions in the designated zone in response to the signal from said zone designating means;
    means for generating a pulse train corresponding to said first clock pattern in response to the signal output from said clock pattern reproducing means;
    means for generating, on the basis of said pulse train from said pulse train generating means, a window signal alternately indicating said servo information regions and said clock information regions;
    switching means for selectively outputting, in response to said window signal, said clock signal from said oscillation means or said pulse train from said pulse train generating means; and
    pattern generating means, connected with said recording head, for generating, on the basis of the output from said switching means and said window signal, a servo pattern to be written in each of said servo information regions and a second predetermined clock pattern which is different for each of said divided zones.

12. A constant-density recording type magnetic disk, comprising:

at least one surface of said magnetic disk being divided into a plurality of zones having boundaries in the radial direction thereof;

a plurality of tracks provided in each of said divided zones and extending in the circumferential direction, the number of said tracks being arbitrary in each of the divided zones;

servo information regions and data recording regions alternately provided on each of said tracks;

a plurality of sectors, each constituted by a pair of adjacent ones of the servo information region and the data recording region, adjacent to each other in the circumferential direction of the disk, and forming in the same zone, substantially the same angle with respect to the rotation center of the magnetic disk;

the servo information regions in the same divided zone and in the same sector being arranged to form a sectoral region substantially extending from the center of said disk;

the physical length of one sector in the innermost track in each said divided zone being substantially the same for each said divided zone; and a generally concentric, annular region provided at each of the boundaries between adjacent ones of said divided zones where not data is recorded by a user, but wherein servo information that is written in each one of the adjacent divided zones is further written in said annular region from respective side edges of said annular region by at least a half track width.

13. A constant-density recording type magnetic disk apparatus comprising:

at least one magnetic disk according to claim 12 attached around a spindle;

at least one magnetic head used for recording/reproduction of data on data recording areas on said magnetic disk;

means for shifting said magnetic disk;

means for detecting, in the radial direction of the disk, deviation of said magnetic head from the track being followed on the basis of the signal reproduced from the servo information area of each of divided zones;

means, connected with said shifting means, for controlling said shifting means in response to the detected signal form said detecting means so that said magnetic head follows the pertinent track; and means for executing recording/reproduction of data on said data recording areas on said magnetic disk.

14. A magnetic disk for magnetically recording reproducing information, comprising:

a plurality of divided zones provided on the magnetic disk in the radial direction of the magnetic disk;

a plurality of tracks provided in each divided zone and extending in the circumferential direction of the magnetic disk;

servo information regions and data recording regions alternately provided on each track, servo information regions in a same divided zone being disposed radially;

a dummy track provided between adjacent divided zones and having a width not smaller than the width of one track; and servo information of each of two adjacent divided zones is written in a dummy track disposed between said adjacent divided zones in such a manner that the servo information region of each of said two adjacent divided zones extends into said dummy track width-wise up to at least the center of said dummy track.

15. A magnetic disk apparatus for magnetically recording/reproducing information on/from a magnetic disk medium by means of a magnetic head, comprising:

said magnetic disk medium including;

a plurality of divided zones provided in the radial direction of said disk medium;

a plurality of tracks provided in each divided zone and extending in the circumferential direction of the disk medium;

servo information regions and data recording regions alternately disposed on each track, servo information regions in a same divided zone being disposed radially;

a dummy track provided between adjacent divided zones, said dummy track having a width not smaller than a width of one of said tracks; and servo information of each of two adjacent divided zones is written in a dummy track disposed between said adjacent divided zone such that a servo information region of each of said two adjacent divided zones extends into said dummy track width-wise up to at least the center of said dummy track;

means for obtaining servo information from said servo information regions and controlling the position of said magnetic head based on the servo information obtained; and means for recording information onto tracks in each divided zone in a constant recording density.

16. A magnetic disk apparatus according to claim 15, further comprising:

a servo magnetic disk having the same rotational axis of said magnetic disk medium;

means for deriving a first servo signal from said servo magnetic disk;

means for deriving a second servo signal from said servo information regions; and a control circuit for processing said first and second servo signals.

17. A magnetic disk apparatus according to claim 16, wherein said control circuit includes at least one of means for switching between said first and second servo signals and means for composing said first and second servo signals.

18. A magnetic disk apparatus according to claim 16, wherein a seek control is effected by using said first servo signal and a following control is effected by using said second servo signal.

19. A constant-density recording type magnetic disk apparatus, comprising a plurality of magnetic disks fixed to a spindle, said disks including at least one first magnetic disk and at least one second magnetic disk, comprising:

said first disk being a constant-density recording type magnetic disk, having;

one surface of which being a servo face divided into a plurality of zones in the radial direction of said first disk;

servo information regions and clock information regions alternately provided on the servo face in the circumferential direction of the first disk;

each of said servo information regions being disposed so as to form a sectoral region substantially starting from the center of the first disk and extending through the divided zones;

each of said clock information regions including a plurality of magnetic transitions representative of clocks, the number of which is different for each of said divided zones;

said second magentic disk having:

- at least one surface of said second disk being divided into a plurality of zones having boundaries in the radial direction thereof;
- a plurality of tracks provided in each of said divided zones and extending in the circumferential direction, the number of said tracks being arbitrary in each of the divided zones;
- servo information regions and data recording regions alternately provided on each of said tracks;
- a plurality of sectors, each constituted by a pair of adjacent ones of the servo information region and the data recording region, adjacent to each other in the circumferential direction of the second disk, and forming in the same zone, substantially the same angle with the rotation center of the second disk;
- the servo information regions in the same divided zone and in the same sector being arranged to form a sectoral region substantially extending from the center of said second disk;
- the physical length of one sector in the innermost track in each said divided zone being substantially the same for each said divided zone;
- a generally concentric, annular region provided at each of the boundaries between adjacent ones of said divided zones where no data is recorded by a user, but wherein servo information that is written in each one of the adjacent divided zones is further written in said annular region from respective side edges of said annular region by at least a half track width; and
- means for executing and recording/reproduction of data on said second disk on the basis of the signals reproduced from said first and second disks.

20. A constant-density recording type magnetic disk apparatus according to claim 19, wherein said executing and recording/reproduction means comprises means for controlling a track seeking operation on the basis of the signal reproduced from said first disk and means for controlling a track following operation on the basis of the signals reproduced from said second disk.

* * * * *